July 7, 1959 E. TOURATON 2,894,214

CODING CIRCUIT

Filed Aug. 27, 1953 2 Sheets-Sheet 1

Inventor
E. TOURATON
By [signature]
Attorney

Inventor
E. TOURATON
By
Attorney

United States Patent Office 2,894,214

Patented July 7, 1959

2,894,214

CODING CIRCUIT

Emile Touraton, Paris, France, assignor to International Standard Electric Corporation, New York, N.Y., a corporation of Delaware Application August 27, 1953, Serial No. 376,957

Claims priority, application France August 28, 1952

7 Claims. (Cl. 332—11)

The present invention relates to coding circuits and more particularly to those used in pulse code transmission systems.

In pulse code transmission systems, the signal to be transmitted, which is generally continuous, is sampled at a suitable frequency and the signal obtained through sampling is then coded.

Coding devices are known which produce for each signal obtained through sampling a group of impulses representing the value of the signal, for example in the binary numbering system.

One of the objects of the present invention is to provide a simple, economical and efficient coding circuit.

According to one of the features of the invention, an amplitude selecting circuit comprises in combination, an input terminal, means for applying to the input terminal variable amplitude signals, an output terminal connected to the input terminal through an impedance having a suitable value, a first polarizing potential source, an asymmetrical conductibility element connected between the output terminal and the said polarizing source in order that the said asymmetrical conductibility element offers a high impedance when the amplitude of the signal applied to the input terminal is greater than the potential of the said first polarizing source, a second polarizing source, a second asymmetrical conductibility element connected between the said output terminal and the said second polarizing source in such manner that it offers a high impedance when the amplitude of the signals applied to the input is lower than the potential of the said second polarizing source, the potential of the first polarizing source being lower than the potential of the second polarizing source, means for connecting in series with the said circuit connecting the input terminal with the output terminal a source of high frequency current, a blocking circuit for the direct current in order to pick out from the output terminal the high frequency current which appears at the output terminal when the amplitude of the signal applied to the input lies between the polarizing potentials.

According to another feature of the invention, in such an amplitude selecting circuit, the impedance connected between the input terminal and the output terminal comprises a resistance having a suitable value connected in parallel with a resonating circuit tuned to the frequency of the high frequency current.

Other objects, features and advantages of the present invention will appear from a reading of the following description of embodiments, the said description being given in conjunction with the annexed drawings in which.

Figure 5:
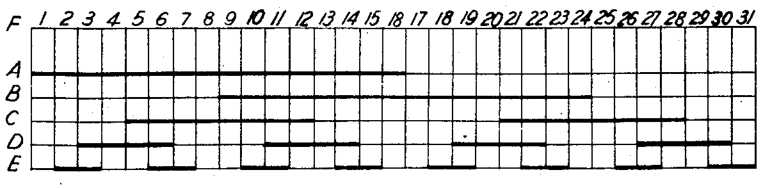
Fig. 5 represents a type of code which may be used.

Fig. 5 shows the code used; this code is known under the name of "reflecting code." It is assumed that it is desired to transmit a maximum of 32 levels, that is, that each coded signal will be defined approximately at a precision of $\frac{1}{32}$. These different levels have been shown on the vertical line F (Fig. 5). There have been shown on the lines A—B—C—D and E the different moments constituting the code, that is the line or lines indicating the levels for which a signal is transmitted. Thus for a signal corresponding to a level 14, a signal is transmitted for the moments A, B, D and E and no signal is transmitted for the moment C. In other words, if one considers for instance the moment C, it is easy to see that a signal is transmitted for the moment if the input signal is comprised between the level 5 and the level 12 or between the level 21 and the level 28.

Figure 1:
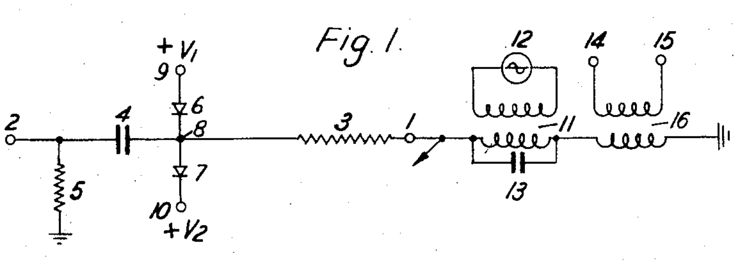
Fig. 1 represents a coding circuit.

There is shown in Fig. 1 an elementary coding circuit. This circuit comprises an input terminal 1 and an output terminal 2. The input terminal 1 is connected to the output terminal through a resistance 3 which, in a particular embodiment, is of the order of 1000 ohms, and a condenser 4. The terminal 2 is connected to the ground through a resistance 5 which in the particular embodiment is of the order of 50,000 ohms. Two rectifiers 6 and 7 are connected to the point 8 through opposed electrodes, the other electrodes being connected respectively to terminals 9 and 10 which are besides brought by means which have not been shown to the potential V1 and V2. The input terminal 1 is connected to the secondary winding of a transformer 11 the primary winding of which is connected to a high frequency generator 12 which gives a current of 10 megacycles per second. The secondary winding is tuned to this frequency by means of a condenser 13, the transformer and the generator being provided in order to obtain at the terminals of the secondary winding of the transformer 11 a high frequency potential the maximum amplitude of which is 0.4 volt. The controlling impulses are applied to the terminals 14 and 15 of the primary winding of a transformer 16 the secondary winding of which is connected in series between the ground and the secondary winding of the transformer 11. The transformer 11, the transformer 16 and the generator 12 may be common to a certain number of elementary coding devices, which has been indicated by the multiplying arrow near the terminal 1.

Figure 2:
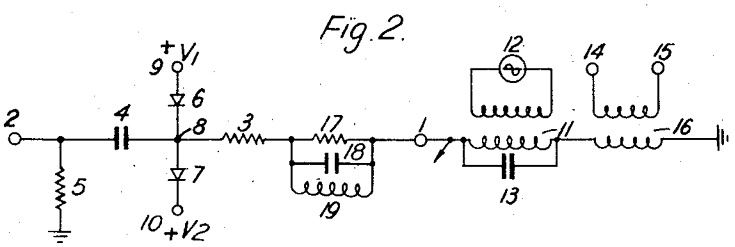
Fig. 2 represents an alternative of the circuit shown in Fig. 1.

In operation it is assumed that an output signal is to be obtained when the amplitude of the signal to be coded obtained at the terminals of the secondary winding of the transformer 16 lies between the potentials V1 and V2 so that in the case under consideration V2 is greater than V1. The operation of the circuit is as follows: if the impulse obtained at the secondary winding of the transformer 16 is lower than the potential V1, for instance 10 volts, the rectifying cell 6 offers a shunt low impedance with respect to the circuit between the terminal 1 and the terminal 2 so that practically no high frequency voltage is obtained at this terminal. If the potential at the terminals of the secondary winding is greater than the potential V2, the rectifying cell 7 offers a shunt low impedance with respect to the circuit between the terminal 1 and the terminal 2. If the potential at the terminals of the secondary winding is comprised between V1 and V2, the two rectifying cells offer a high impedance to the passage of the current and provided the impedances connected in the circuit have been chosen with a suitable value with respect to that of the rectifiers 7 and 6, there is obtained at the terminal 2 the high frequency current obtained as from the secondary winding of the transformer 11. One sees therefore that this circuit gives an output signal when the input signal obtained at the terminals of the secondary winding of the transformer 16 is comprised between V1 and V2. This circuit offers the advantage of giving a high frequency output signal the amplitude of which is practically independent of the amplitude of the controlling signal when the latter is comprised between the potentials V1 and V2. There is shown in Fig. 2 an alternative comprising in series in the circuit between the terminal 1 and the terminal 2 a high value resistance connected in parallel with a circuit tuned at 10 megacycles per second. The value of the resistance 17 in the embodiment under consideration is of the order of 9,000 ohms and the tuned circuit, constituted by the inductance 18 and the condenser 19, offers a low impedance to the passage of the current traversing the rectifiers 6 and 7. The operation of the circuit is besides identical to that of Fig. 1 and the elements fulfilling the same function have been designated by the same references.

Figure 3:
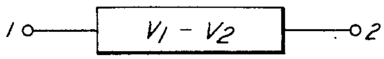
Fig. 3 represents schematically an elementary coding circuit.

Fig. 3 shows schematically a type of elementary coding device according to Fig. 1 or Fig. 2. There are shown inside the rectangle representing the circuits two voltages V1 and V2 indicating the limits of the amplitude values between which an output signal is obtained.

Figure 4:
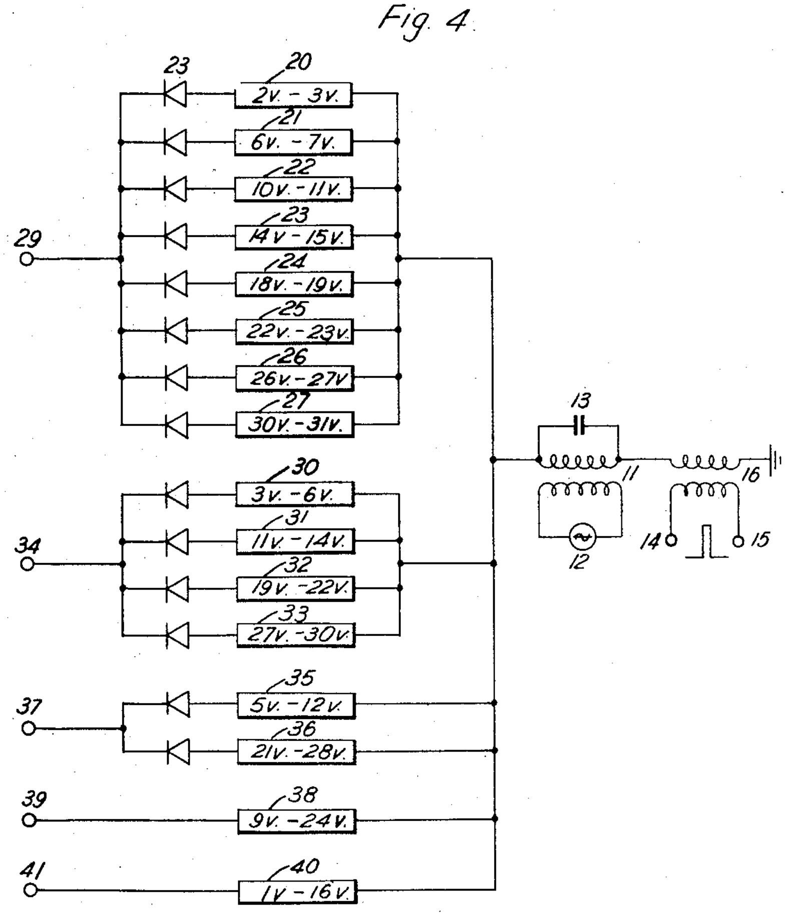
Fig. 4 represents schematically the whole of the coding circuit.

Fig. 4 shows a coding circuit for coding permitting to code the signals according to the code shown in Fig. 5. It is assumed that the amplitude of the input impulses is comprised between 0 volt and 31 volts. The eight elementary circuits 20, 21, 22, 23, 24, 25, 26 and 27 permit the production of signals corresponding to the moments E (Fig. 5). They are all connected in parallel and their outputs are decoupled by means of rectifiers such as 28, the output signals corresponding to the moments E being obtained at the terminal 29. The elementary circuits 30, 31, 32 and 33 permit the production at the output terminal 34 of the signals corresponding to the moment D. The elementary circuits 35 and 36 fulfill the same function for the moment C and the corresponding signals are obtained at the terminal 37. The elementary circuit 38 permits the production at the terminal 39 of the signals corresponding to the moment B whereas the elementary circuit 40 permits to obtain signals at the terminal 41. In this figure, the elements common to all the elementary circuits have been designated by the same references as in Figs. 1 and 2. It is easy to see that the signals obtained at the terminals 41, 39, 37, 34 and 29 correspond to the moments A, B, C, D and E of the so-called "reflective" code shown in Fig. 5.

By utilizing elementary circuits for which one would choose suitable potentials V1 and V2, it would obviously be possible to obtain a circuit permitting the coding of the impulses applied to the terminals 14 and 15 of the transformer 16 according to another code such as the binary code.

While the principles of the invention have been described above in connection with specific embodiments and particular modifications thereof, it is to be clearly understood that this description is made only by way of example and not as a limitation on the scope of the invention.

What is claimed is:

1. An amplitude discriminating circuit for producing a predetermined output only when the input signal voltage falls between two predetermined limits comprising an input control pulse source of variable amplitude, a relatively high frequency source having an amplitude intermediate the two limits, and a tuned circuit coupled to said frequency source and tuned to said high frequency, an electrical transmission path having an input and output, means coupling said control pulse source and said high frequency source in series to said input, a pair of rectifiers, a pair of biasing potential sources, one at the higher of said limits and the other at the lower of said limits, a pair of shunting circuits each connected across said path and each including one of said rectifiers in series with one of said biasing potential sources, the lower potential source being poled so as to bias its associated rectifier in a conducting direction, the higher potential source being poled so as to bias its associated rectifier in its non-conducting direction and means in series in said path between said shunting circuits and said output for blocking direct current potentials while passing the potentials from said high frequency source.

2. An amplitude discriminating circuit according to claim 1 further including an impedance in series in said path between said output and said shunting circuits.

3. An amplitude discriminating circuit according to claim 2 wherein said impedance comprises a resistance and a circuit connected in parallel with said resistance tuned to the frequency of said high frequency source.

4. An amplitude discriminating circuit according to claim 1 wherein said means for blocking the direct current potentials is a capacitance.

5. A pulse code modulation system comprising a common input, a plurality of separate outputs, means for applying the signal to be coded to said input, means for applying in series with said signal a high frequency wave, comprising a common source of high frequency and a circuit tuned to said source frequency and coupled to said input and a plurality of means each connected between the input and a separate one of said outputs for producing at each output a high frequency signal representing one digit of a pulse code signal in response to an input signal of one or more predetermined amplitudes, said last mentioned means comprising at least one separate amplitude discriminating circuit between the common input and each output, said discriminating circuit including means for passing high frequency to the output when the input signal is between a pair of predetermined limits, said pair of limits differing for each said discriminatng circuit.

6. A pulse code modulation system according to claim 5 wherein each of the discriminating circuits connected to any of said outputs covers between its limits a range which does not overlap the range covered by any other discriminating circuit connected to the same output.

7. An amplitude discriminating circuit producing a predetermined output only when the input signal voltage falls between two predetermined limits comprising an input signal source of variable amplitude, a relatively high frequency source, an electrical transmission path having an input and output, means coupling said signal source and said high frequency source in series to said input, a pair of rectifiers, a pair of biasing potential sources, one at the higher of said limits and the other at the lower of said limits, a pair of shunting circuits each connected across said path and each including one of said rectifiers in series with one of said biasing potential sources, the lower potential source being poled so as to bias its associated rectifier in a conducting direction, the higher potential source being poled so as to bias its associated rectifier in its non-conducting direction and means in series in said path between said shunting circuits and said output for blocking direct current potentials while passing the potentials from said high frequency source, an impedance in series in said path between said output and said shunting circuits, said impedance comprising a resistance and a circuit connected parallel with said resistance tuned to the frequency of said high frequency source.

References Cited in the file of this patent

UNITED STATES PATENTS

| | | |
|---|---|---|
| 2,116,559 | Caruthers | May 10, 1938 |
| 2,453,461 | Schelling | Nov. 9, 1948 |
| 2,541,039 | Cole | Feb. 13, 1951 |
| 2,556,200 | Lesti | June 12, 1951 |
| 2,607,888 | Bell | Aug. 19, 1952 |
| 2,616,960 | Dell et al. | Nov. 4, 1952 |
| 2,748,269 | Slutz | May 29, 1956 |
| 2,775,698 | Bell et al. | Dec. 25, 1956 |